United States Patent
He et al.

(10) Patent No.: US 10,097,234 B2
(45) Date of Patent: Oct. 9, 2018

(54) FULL DUPLEX RADIO WITH ADAPTIVE RECEPTION POWER REDUCTION

(71) Applicant: Huawei Technologies Co., Ltd., Shenzhen (CN)

(72) Inventors: Gaoning He, Boulogne Billancourt (FR); Marco Maso, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/675,196

(22) Filed: Aug. 11, 2017

(65) Prior Publication Data
US 2017/0338853 A1 Nov. 23, 2017

Related U.S. Application Data

(63) Continuation of application No. PCT/EP2015/052929, filed on Feb. 12, 2015.

(51) Int. Cl.
*H04B 1/525* (2015.01)
*H04W 52/18* (2009.01)
(Continued)

(52) U.S. Cl.
CPC ............ *H04B 1/525* (2013.01); *H02J 7/0063* (2013.01); *H04B 1/3805* (2013.01); *H04L 12/10* (2013.01); *H04W 52/18* (2013.01)

(58) Field of Classification Search
CPC ..... H04B 1/525; H04B 1/3805; H02J 7/0063; H04L 12/10; H04W 52/18
(Continued)

(56) References Cited

U.S. PATENT DOCUMENTS 7,762,470 B2 * 7/2010 Finn ..................... G06K 7/0004
235/380
8,149,742 B1 * 4/2012 Sorsby ................... H04B 1/006
370/219
(Continued)

FOREIGN PATENT DOCUMENTS

| CN | 104113224 A | 10/2014 |
|---|---|---|
| EP | 1841084 A2 | 10/2007 |
| WO | 2014048114 A1 | 4/2014 |

OTHER PUBLICATIONS

Knox, "Single Antenna Full Duplex Communications using a Common Carrier," IEEE 13th Annual Wireless and Microwave Technology Conference, Institute of Electrical and Electronics Engineers, New York, New York (2012).
(Continued)

*Primary Examiner* — Hai V Nguyen
(74) *Attorney, Agent, or Firm* — Leydig, Voit & Mayer, Ltd.

(57) ABSTRACT

A full duplex radio unit comprising a transmission unit, an antenna, a reception unit, a circulator and a power reduction unit is provided. The transmission unit is adapted to generate a first signal. The circulator is adapted to provide the first signal from the transmission unit to the antenna. The antenna is adapted to transmit the first signal and simultaneously receive a second signal using an identical frequency or frequency band. The circulator is adapted to provide a third signal to the power reduction unit, wherein the third signal comprises the second signal and interference generated from the first signal by the antenna and the circulator. The power reduction unit is adapted to reduce the power of the third signal by multiplying the third signal by factor of $\sqrt{\rho}$, wherein $\rho$ is between zero and one, thereby generating a fourth signal.

15 Claims, 6 Drawing Sheets

(51) Int. Cl.
*H04L 12/10* (2006.01)
*H02J 7/00* (2006.01)
*H04B 1/3805* (2015.01)

(58) Field of Classification Search
USPC .......................................... 455/574; 327/544
See application file for complete search history.

(56) References Cited

U.S. PATENT DOCUMENTS

| | | | | |
|---|---|---|---|---|
| 8,957,550 | B2* | 2/2015 | Torres Canton | H04B 3/32 307/147 |
| 8,989,810 | B2* | 3/2015 | Hsia | H04B 17/13 455/343.2 |
| 9,036,749 | B2* | 5/2015 | Choi | H04L 5/143 375/346 |
| 9,077,421 | B1* | 7/2015 | Mehlman | H04B 1/10 |
| 9,124,475 | B2* | 9/2015 | Li | H04L 27/2601 |
| 9,231,647 | B2* | 1/2016 | Polydoros | H04B 1/62 |
| 9,236,996 | B2* | 1/2016 | Khandani | H04L 5/1423 |
| 9,413,516 | B2* | 8/2016 | Khandani | H04B 1/525 |
| 9,455,756 | B2* | 9/2016 | Choi | H04L 5/143 |
| 9,479,322 | B2* | 10/2016 | Khandani | H04L 5/1423 |
| 9,602,157 | B2* | 3/2017 | Eltawil | H04B 1/123 |
| 9,673,854 | B2* | 6/2017 | Choi | H04B 1/525 |
| 9,673,960 | B2* | 6/2017 | Eltawil | H04L 5/1453 |
| 9,698,860 | B2* | 7/2017 | Bharadia | H04B 1/525 |
| 9,712,233 | B1* | 7/2017 | Deng | H04B 10/11 |
| 9,713,010 | B2* | 7/2017 | Khandani | H04W 16/14 |
| 9,774,405 | B2* | 9/2017 | Bharadia | H04B 15/00 |
| 9,781,685 | B2* | 10/2017 | Tsui | H04W 52/243 |
| 9,832,003 | B2* | 11/2017 | Bharadia | H04L 5/1438 |
| 9,906,262 | B2* | 2/2018 | Hua | H04B 1/52 |
| 2004/0142700 | A1 | 7/2004 | Marinier | |
| 2010/0329680 | A1* | 12/2010 | Presi | H04B 10/2587 398/79 |
| 2011/0077719 | A1 | 3/2011 | Rofougaran | |
| 2011/0299412 | A1* | 12/2011 | Diab | H04L 12/12 370/252 |
| 2011/0300914 | A1* | 12/2011 | Gudem | H04B 1/1027 455/574 |
| 2012/0062366 | A1* | 3/2012 | Pappu | G06K 7/10009 340/10.1 |
| 2012/0075072 | A1* | 3/2012 | Pappu | H04B 5/0037 340/10.1 |
| 2013/0089009 | A1* | 4/2013 | Li | H04L 27/2601 370/278 |
| 2013/0301487 | A1* | 11/2013 | Khandani | H04W 16/14 370/278 |
| 2014/0079143 | A1* | 3/2014 | Torres Canton | H04B 3/32 375/257 |
| 2015/0023225 | A1* | 1/2015 | Li | H04B 1/525 370/277 |
| 2015/0043685 | A1* | 2/2015 | Choi | H04L 5/143 375/346 |
| 2015/0141027 | A1* | 5/2015 | Tsui | H04W 52/243 455/452.1 |
| 2015/0156003 | A1* | 6/2015 | Khandani | H04L 5/143 370/278 |
| 2015/0156004 | A1* | 6/2015 | Khandani | H04L 5/1423 370/278 |
| 2015/0171903 | A1* | 6/2015 | Mehlman | H04B 1/10 375/346 |
| 2015/0200764 | A1 | 7/2015 | Lin et al. | |
| 2015/0263780 | A1* | 9/2015 | Mehlman | H04B 1/10 375/219 |
| 2015/0270865 | A1* | 9/2015 | Polydoros | H04B 1/62 375/346 |
| 2015/0311928 | A1* | 10/2015 | Chen | H04B 1/525 375/350 |
| 2015/0318976 | A1* | 11/2015 | Eltawil | H04B 1/123 370/278 |
| 2015/0333847 | A1* | 11/2015 | Bharadia | H04B 15/00 455/63.1 |
| 2015/0341157 | A1* | 11/2015 | Eltawil | H04L 5/1453 370/278 |
| 2016/0020894 | A1* | 1/2016 | Tetzlaff | H04L 5/1461 370/278 |
| 2016/0043759 | A1* | 2/2016 | Choi | H04L 5/143 375/346 |
| 2016/0105213 | A1* | 4/2016 | Hua | H04B 1/525 370/278 |
| 2016/0127113 | A1* | 5/2016 | Khandani | H04L 5/1423 370/278 |
| 2016/0173164 | A1* | 6/2016 | Kim | H04B 1/44 370/278 |
| 2016/0219024 | A1* | 7/2016 | Verzun | H04L 63/102 |
| 2016/0226535 | A1* | 8/2016 | Choi | H04B 1/525 |
| 2016/0233903 | A1* | 8/2016 | Wu | H04B 1/12 |
| 2016/0234005 | A1* | 8/2016 | Hong | H04B 15/00 |
| 2016/0266245 | A1* | 9/2016 | Bharadia | G01S 7/038 |
| 2016/0285504 | A1* | 9/2016 | Hua | H04B 1/123 |
| 2016/0380670 | A1* | 12/2016 | Liu | H01P 1/213 455/73 |
| 2017/0005773 | A1* | 1/2017 | Liu | H04B 1/525 |
| 2017/0026073 | A1* | 1/2017 | Liu | H04B 1/50 |
| 2017/0041121 | A1* | 2/2017 | Noh | H04W 52/325 |
| 2017/0041124 | A1* | 2/2017 | Khandani | H04L 5/1423 |
| 2017/0104574 | A1* | 4/2017 | Hahn | H04L 5/14 |
| 2017/0163404 | A1* | 6/2017 | Liu | H04L 5/14 |
| 2017/0170948 | A1* | 6/2017 | Eltawil | H04L 5/1461 |
| 2017/0187513 | A9* | 6/2017 | Bharadia | H04L 5/1461 |
| 2017/0195107 | A1* | 7/2017 | Liu | H04L 5/14 |
| 2017/0201315 | A1* | 7/2017 | Avellan | H04B 7/18543 |
| 2017/0207532 | A1* | 7/2017 | Wang | H01Q 1/48 |
| 2017/0223688 | A1* | 8/2017 | Chen | H04W 72/042 |
| 2017/0237547 | A1* | 8/2017 | Eltawil | H04L 5/1461 370/278 |
| 2017/0264420 | A1* | 9/2017 | Bharadia | H04L 5/1438 |
| 2017/0302337 | A1* | 10/2017 | Liu | H04B 7/005 |
| 2017/0339569 | A1* | 11/2017 | Khandani | H04W 12/04 |
| 2017/0353212 | A1* | 12/2017 | Bharadia | H04B 1/525 |
| 2018/0070394 | A1* | 3/2018 | Khandani | H04W 76/10 |

OTHER PUBLICATIONS

Phungamngern et al., "Digital and RF Interference Cancellation for Single-Channel Full-duplex Transceiver Using a Single Antenna," IEEE International Conference on Electrical Engineering/Electronics, Computer, Telecommunications and Information Technology (ECTI-CON), Institute of Electrical and Electronics Engineers, New York, New York (May 2013).

Jain et al., "Practical, Real-time, Full Duplex Wireless," Proceedings of ACM International Conference Mobile Computer Network., pp. 301-312 (2011).

Bharadia et al., "Full duplex radios," Proceedings of ACM SIGCOMM Conference Data Communication, pp. 375-386, (Aug. 2013).

Visser et al., "Remote RF Battery Charging",Power MEMS 2010: 10th International Workshop Micro and Nanotechnology for Power Generation and Energy Conversion Applications, Leuven, Belgium (Nov. 30-Dec. 3, 2010).

Zhang et al., "A Novel Planar Structure for Implementing Power Divider or Balun with Variable Power Division," Progress in Electromagnetics Research C, vol. 48, pp. 111-123 (2014).

* cited by examiner

FULL DUPLEX RADIO WITH ADAPTIVE RECEPTION POWER REDUCTION

CROSS-REFERENCE TO RELATED APPLICATIONS

This application is a continuation of International Patent Application No. PCT/EP2015/052929, filed on Feb. 12, 2015, the disclosure of which is hereby incorporated by reference in its entirety.

TECHNICAL FIELD

Embodiments of the invention relate to a full duplex radio and an associated method.

BACKGROUND

To meet the ever-increasing capacity demand due to popular multimedia applications in mobile devices, many approaches have been proposed to enhance the system throughput for modern wireless systems. One of the most promising approaches is full duplex radio, since it transmits and receives signals using the same frequency band at the same time.

This approach can help to reduce the bandwidth footprint of the transmission while keeping the overall resulting transmission rate untouched. By means of this approach a double throughput improvement as compared to half duplex radio is achievable. Accordingly, one of the most challenging research fronts in modern wireless communication research is the design of architectures and solutions to realize effective full duplex communications.

A full duplex radio is a device which is able to transmit and receive signals on the same channel simultaneously. The most attractive and challenging solution inside this family of radio devices is the so-called in-band single antenna full duplex implementation. In this case, the device not only transmits and receives simultaneously over the same band but also does this by means of a single antenna. This can positively impact the cost of the device, which in turn does not need two or more separate circuitries and antennas to realize the full duplex communication.

However, due to the limitations of the practical hardware architecture, a very severe problem affects in-band single antenna full duplex radios, i.e., the so-called self-interference (SI). In practice, the self-interference is a portion of the transmit signal that leaks from the transmit (TX) chain to the receive (RX) chain of the device, due to the non-ideality of the employed circulator, a three input/output component which is meant to connect the antenna to both chains. If unmanaged, the SI can compromise the performance of the radio device irreversibly. This is due to its very high power as compared to the power of the incoming signal, which reaches the antenna with very low power, due to attenuations induced by the wireless propagation. Thus, the desired signal suffers from the residual SI, and the overall throughput degrades. In fact, the resulting signal to interference plus noise ratio (SINR) quantity which measures the intensity of the desired signal over the intensity of all the possible disturbances is extremely low. In this context, a correct decoding cannot be performed unless the SI can be significantly reduced, if not canceled.

As a matter of fact, in-band single-antenna full duplex radios cannot avoid a certain signal leakage from the transmit chain to the receive chain during the transmission. This induces the presence of high levels of SI affecting the received signal. At present, this is still a very challenging problem. The research in this field is still at a very early stage.

In FIG. 1, an example of a full duplex radio unit 1 is depicted. A transmission unit 3, also referred to as transmission chain TX is connected to a circulator 5, which is connected to an antenna 6 and to a reception unit 4, which is also referred to as reception chain RX. Moreover, the transmission unit 3 and the reception unit 4 are connected to an interference cancellation unit 9, which is composed of an analog interference cancellation unit 7 and a digital interference cancellation unit 8.

The circulator 5 comprises three ports A, B and C. In particular, A is the port to which the TX chain 3 is connected, B is the port to which the RX chain 4 is connected and C is the port to which the antenna 6 is connected. In practice, the circulator 5 provides limited isolation between port A and port B, resulting in interference between the TX chain 3 and the RX chain 4. The TX radio frequency (RF) signal, i.e., x, transits through port A, which routes it towards port C to reach the antenna 6. Alternatively, the received signal, i.e., z, is passed from the antenna 6 through port C, and is routed towards port B. As a matter of fact, non-ideal circulators do not provide perfect isolation between port A and port B.

Thus, a portion of the TX signal x, i.e., f(x), with $|f(x)| \leq |x|$, leaks from port A to port B, generating interference to the received signal. Assuming the presence of a thermal noise affecting the system, usually present in non-ideal circuits, we can express the output signal from B as $$y = f(x) + z + n$$

where n represents the aforementioned thermal noise, added here for the sake of simplicity in the representation.

As previously said, the exemplary solution depicted here implements a two-step SI cancellation strategy which can remove the SI component from y. The goal is to reduce the level of SI, such that its power is lower or equal than the so-called noise-floor, which is given by the sum of all the noise sources and unwanted signals within the system, previously denoted by n. As previously discussed, the SI cancellation capabilities of such a device depend on both the transmit power of the device and the noise floor. In practice, if the transmit power is high, or the noise floor is low (or a combination of the two events occurs), then residual SI interference will appear in the RX chain.

Dynamic algorithms are able to estimate the distortions introduced by the analog circuits and model the actual SI present in the RX chain 4. Accordingly, a programmable analog cancellation circuit, here referred to as analog interference cancellation unit 7 is adopted to implement them. A digital cancellation algorithm performed by the digital interference cancellation unit 8 complements the analog one to cancel the residual SI. This approach is shown to deliver around 110 dB of overall cancellation. We conclude that when the transmit power of the full duplex radio is below a certain value, the SI signal can be cancelled completely. Conversely, the desired signal suffers from the residual SI signal.

In general, we can see this as a limit for the effectiveness of the full duplex radio. Furthermore, from the point of view of energy consumption and efficiency, directly cancelling the high strength SI signal reduces the energy efficiency of the device, due to the amount of energy that is wasted. As a consequence, two main problems can be identified. On the one hand, the above shown approach still suffers from residual SI, and has an upper bound in terms of allowed transmit power for the full duplex radio. On the other hand, at present, no full duplex radio based idea tackles the problem of the energy which is wasted in the transmission/reception process.

When the full duplex radio transmits and receives signals at the same time, if the transmit power is above the maximum level that guarantees the effectiveness of the SI cancellation, the residual SI reduces the SINR of the received signal, thus affects both the spectral and the energy efficiency. In case though the transmit power is below the maximum level that guarantees the effectiveness of the SI cancellation, the full duplex system can effectively remove the SI and achieve the expected spectral and energy efficiency. Both power and energy efficiency of the full duplex radio therefore strongly depend on the effectiveness of the SI cancellation, and thus on the transmit power.

SUMMARY

Accordingly, an embodiment of the present invention provides a full duplex radio unit and a full duplex radio method, which have only a very low self interference and at the same time allow for a high transmission power.

According to a first aspect of the invention, a full duplex radio unit comprising a transmission unit, an antenna, a reception unit, a circulator and a power reduction unit is provided. The transmission unit is adapted to generate a first signal. The circulator is adapted to provide the first signal from the transmission unit to the antenna. The antenna is adapted to transmit the first signal and simultaneously receive a second signal using an identical frequency or frequency band. The circulator is adapted to provide a third signal to the power reduction unit, wherein the third signal comprises the second signal and interference generated from the first signal by the antenna and the circulator. The power reduction unit is adapted to reduce the power of the third signal by multiplying the third signal by factor of $\sqrt{\rho}$, wherein $\rho$ is between zero and one, thereby generating a fourth signal. The reception unit is adapted to receive the fourth signal. By reducing the power of the reception signal, it is thereby possible to significantly reduce self-interference.

According to a first implementation form of the first aspect, the full duplex radio unit comprises an interference cancellation unit adapted to generate at least one interference cancellation signal and to provide the at least one interference cancellation signal to the reception unit. The reception unit is adapted to cancel at least part of the interference by adding the interference cancellation signal to the fourth signal or an intermediate signal derived from the fourth signal by the reception unit. It is thereby possible to further reduce interference.

According to a second implementation form of the first aspect, the power reduction unit is adapted to determine and set the factor $\sqrt{\rho}$ depending upon the transmission power of the first signal. It is thereby possible to maximize the transmission power while keeping the interference to a minimum.

According to a first implementation form of the first implementation form of the first aspect of the invention, the power reduction unit is adapted to determine and set the factor $\sqrt{\rho}$ depending upon a transmission power of the first signal and/or a noise level and/or an interference level within the third signal, so that a pre-set target signal-to-interference-plus-noise-ratio SINR of the fourth signal is reached. An especially high transmission power and a low self-interference is thereby reached.

According to a second implementation form of the first implementation form of the first aspect of the invention, the power reduction unit is adapted to determine and set the factor $\sqrt{\rho}$ such that the signal-to-interference-plus-noise-ratio SINR of the fourth signal is higher than the signal-to-interference-plus-noise-ratio of the third signal. A further reduction of the self-interference thereby can be reached.

According to a third implementation form of the first aspect of the invention, the power reduction unit comprises a signal splitter adapted to split the third signal into the fourth signal and a fifth signal. The signal splitter is adapted to split the third signal so that the fourth signal is the third signal multiplied by $\sqrt{\rho}$ and the fifth signal is the third signal multiplied by $\sqrt{(1-\rho)}$. It is thereby possible to further use the signal energy within the fifth signal.

According to a first implementation form of the third implementation form of the first aspect, the power reduction unit comprises an energy harvesting unit adapted to harvest at least part of the energy of the fifth signal. It is thereby possible to charge for example the battery of the device using the harvested energy.

According to a first implementation form of the first implementation form of the third implementation form of the first aspect of the invention, the energy harvesting unit is adapted to at least partially power the full duplex radio unit using the harvested energy of the fifth signal. A very high energy efficiency can thereby be reached.

According to a second implementation form of the first implementation form of the third implementation form of the first aspect of the invention, the full duplex radio unit comprises a battery. The energy harvesting unit is then adapted to charge the battery using the harvested energy of the fifth signal. An especially high energy efficiency of the full duplex radio unit can thereby be achieved.

According to a second aspect of the present invention, a full duplex radio transmission and reception method is provided. The method comprises generating a first signal, providing the first signal to an antenna, transmitting the first signal by the antenna and simultaneously receiving a second signal using an identical frequency or frequency band as the first signal by the antenna. Moreover, the method comprises providing a third signal by a circulator, wherein the third signal comprises the second signal and interference generated from the first signal by the antenna and the circulator. Moreover, the method comprises reducing the power of the third signal by multiplying the third signal with a factor of $\sqrt{\rho}$, wherein $\rho$ is between zero and one, thereby generating a fourth signal, and receiving the fourth signal. Thereby, a high transmission power and a low self-interference can be achieved.

According to a first implementation form of the second aspect, the full duplex radio method comprises generating at least one interference cancellation signal and cancelling at least part of the interference by adding the interference cancellation signal to the fourth signal or an intermediate signal derived from the fourth signal. It is thereby possible to further reduce interference.

According to a second implementation form of the second aspect, the factor $\sqrt{\rho}$ is set depending upon the transmission power of the first signal. It is thereby possible to increase the transmission power while keeping the interference to a minimum.

According to a first implementation form of the first implementation form of the second aspect of the invention, the factor $\sqrt{\rho}$ is set depending upon a transmission power of the first signal and/or a noise level and/or an interference level within the third signal, so that a pre-set target signalto-interference-plus-noise-ratio SINR of the fourth signal is reached. An especially high transmission power and a low self-interference are thereby reached.

According to a second implementation form of the first implementation form of the second aspect of the invention, the factor $\sqrt{\rho}$ is such that the signal-to-interference-plus-noise-ratio SINR of the fourth signal is higher than the signal-to-interference-plus-noise-ratio of the third signal. A further reduction of the self-interference thereby can be reached.

According to a third implementation form of the second aspect of the invention, the third signal is split into the fourth signal and a fifth signal. The third signal is split so that the fourth signal is the third signal multiplied by $\sqrt{\rho}$ and the fifth signal is the third signal multiplied by $\sqrt{(1-\rho)}$. It is thereby possible to further use the signal energy within the fifth signal.

According to a first implementation form of the third implementation form of the second aspect, at least part of the energy of the fifth signal is harvested. It is thereby possible to charge for example the battery of the device using the harvested energy.

According to a first implementation form of the first implementation form of the third implementation form of the second aspect of the invention, a full duplex radio unit carrying out the method is at least partially powered using the harvested energy of the fifth signal. A very high energy efficiency can thereby be reached.

According to a second implementation form of the first implementation form of the third implementation form of the second aspect of the invention, a battery of a full duplex radio unit carrying out the method is charged using the harvested energy of the fifth signal. An especially high energy efficiency of the full duplex radio unit can thereby be achieved.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF DRAWINGS

The present invention is in the following explained in detail in relation to embodiments of the invention in reference to the enclosed drawings, in which.

DESCRIPTION OF EMBODIMENTS

Embodiments of the invention provide a solution that can increase both the energy efficiency of the full duplex radio unit and the spectral efficiency of the incoming transmission, which is also referred to as the uplink. In practice, we propose a solution that can tackle both above-mentioned problems at the same time, making profitable use of the presence of an abundance of SI in the RX chain. Considering the case where the transmit power is higher than the value which allows to achieve a complete SI cancellation, with the solution depicted in FIG. 1 it would not be possible to completely remove the SI, thus the overall resulting SINR will be lower, in turn reducing the throughput of the uplink transmission. Accordingly, the full duplex radio unit 2 would operate in a regime in which an increase in the transmit power would increase the achievable downlink rate but significantly decrease the uplink rate. This invention specifically targets this scenario and complements the current technology to improve the energy efficiency of the full duplex transmission, while guaranteeing a good performance in terms of uplink rate.

Figure 2:
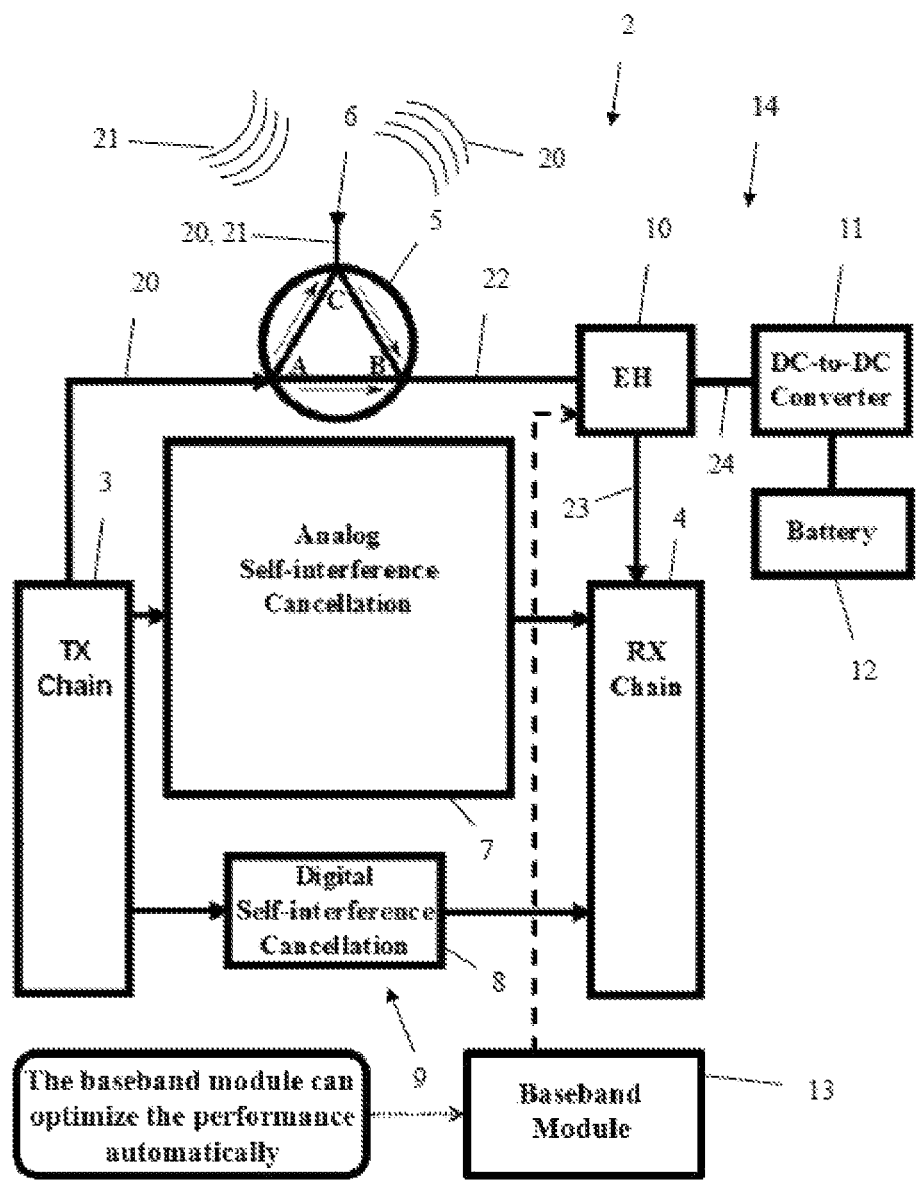
FIG. 2 shows an embodiment of the inventive full duplex radio unit in a block diagram.
Figure 3:
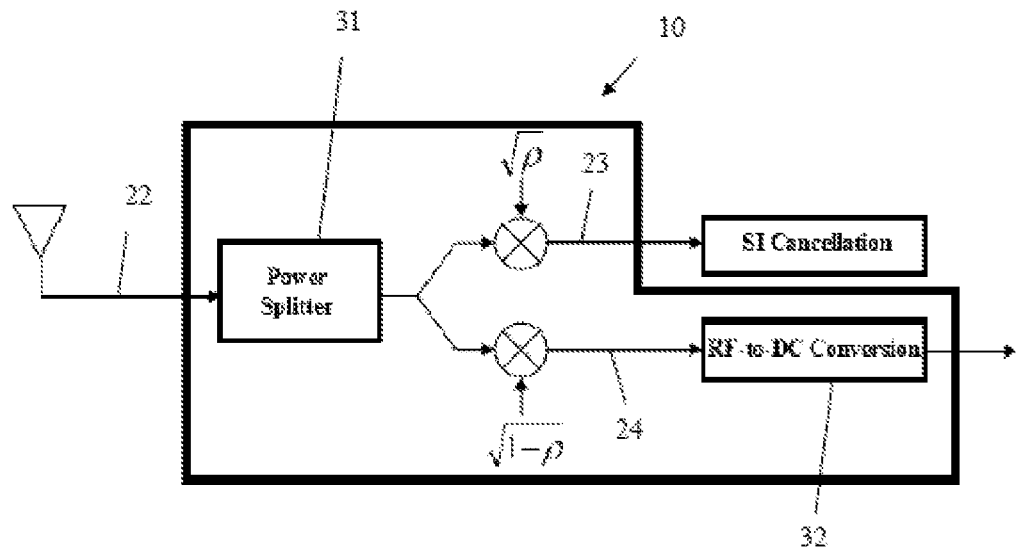
FIG. 3 shows a detail of the embodiment of the inventive full duplex radio unit in a block diagram.
Figure 4:
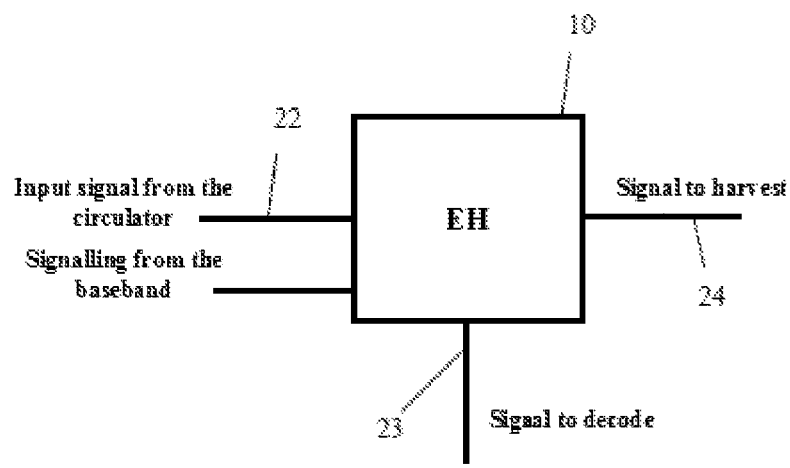
FIG. 4 shows a further detail of the embodiment of the first embodiment of the full duplex radio unit in a block diagram.

First we demonstrate the construction and function of an embodiment of the inventive full duplex radio unit along FIG. 2-FIG. 4. With regard to FIG. 5, the performance gain of embodiments of the present invention is shown. Along FIG. 6 and FIG. 7 different embodiments of the inventive full duplex radio transmission and reception method are described. Similar entities and reference numbers in different figures have been partially omitted.

In FIG. 2, a full duplex radio unit 2 is depicted. Large parts of the full duplex radio unit 2 of FIG. 2 are identical to the full duplex radio unit 1 of FIG. 1. Especially, the transmission unit 3, the reception unit 4, the circulator 5, the antenna 6 and the interference cancellation unit 9, including the analog interference cancellation unit 7 and the digital interference cancellation unit 8 are identical.

In addition, the full duplex radio unit 2 of FIG. 2 comprises a power reduction unit 14, which is coupled between the circulator 5 and the reception unit 4. Especially, the power reduction unit 14 comprises an energy harvesting unit 10, and a DC-to-DC converter 11. The energy harvesting unit 10 is coupled between the circulator 5 and the reception unit 4. An output of the energy harvesting unit 10 is coupled to the DC-to-DC converter 11.

Moreover, the full duplex radio unit 2 comprises a battery 12, which is used to power the full duplex radio unit. Energy lines for powering the full duplex radio unit by the battery are omitted here. The battery 12 is connected to the DC-to-DC converter 11.

Moreover, the full duplex radio unit 2 comprises a baseband module 13, which is connected to the energy harvesting unit 10 of the power reduction unit 14.

Further connections of the base band module 13 are omitted here, for reasons of clarity. In practice, the baseband module 13 is connected to the energy harvesting unit 10, since it provides the information about the suitable splitting factor ρ to achieve the target signal to interference-plus-noise-ratio SINR.

While in operation, the transmission unit 3 generates a baseband signal and subsequently modulates it as a first RF signal 20 from the baseband signal. The first signal 20 is handed by the circulator 5 to the antenna 6 and transmitted. At the same time, a second signal 21 is received by the antenna 6 and handed to the circulator 5. Within the circulator 5, a third signal 22 is generated from the second signal 21 and interference from the first signal 20. The third signal 22 is handed on to the power reduction unit 14, especially to the energy harvesting unit 10. The energy harvesting unit 10 splits the third signal 22 into a fourth signal 23 and a fifth signal 24. The fourth signal 23 is handed to the reception unit 4, as described earlier. The fifth signal 24 is handed on to the DC-to-DC converter 11 and converted to usable energy. The battery 12 is than charged using the usable energy provided by the DC-to-DC converter 11. It is also possible, to directly power the full duplex radio unit 2 using this power.

The energy harvesting unit 10 splits the third signal 22 into the fourth signal 23 and the fifth signal 24 based upon a splitting factor ρ. This splitting factor is determined by the baseband module 13 and communicated to the energy harvesting unit 10 based upon a transmission power of the first signal 20 and/or a noise level and/or an interference level within the third signal 23, so that a preset target signal to interference-plus-noise-ratio of the fourth signal 23 is reached. Especially, the factor ρ is set so that the signal-to-interference-plus-noise ratio of the fourth signal is higher than the signal to interference-plus-noise ratio of the third signal. Thereby, it is possible to cancel out all interference within the fourth signal 23 using the interference cancellation unit 9.

In order to be able to satisfy the target performance requirements for the system, the energy harvesting unit 10 is advantageously implemented with an adaptive behavior. Accordingly, the baseband module 13 is adapted, to provide an adaptive behavior to the signal splitter and optimize the performance of the energy harvesting unit 10. In order to understand the impact of this feature, let us consider simple non-adaptive choices of ρ such as:

ρ=0: The entirety of the signal 22 coming from the circulator 5 is harvested, the information rate is completely compromised and the full-duplex radio operates in energy-saving mode.

ρ=1: The entirety of the signal 22 coming from the circulator 5 is used to decode information. The information rate of the useful transmission depends on the transmit power of the full-duplex radio, which operates in legacy state-of-the-art mode.

In practice, the aforementioned examples are simple bounds that show what are two extremes in terms of spectral/energy efficiency that the novel architecture can achieve. Naturally, they do not represent the most interesting scenarios. In fact, the baseband module 13 can alter the power splitting factor ρ depending on the transmit power of the full duplex radio and the target performance for the transmission. In this sense, the manufacturer of the device can set different operating policies to achieve dynamic levels of spectral efficiency of the uplink and energy efficiency of the full-duplex radio. Remarkably, the impact of the transmit power on the effectiveness of the SI cancellation is always lower as compared to state-of-the-art solutions, regardless of the choice of the adopted value for ρ, as long as ρ<1.

As a matter of fact, the adoption of the baseband module 13 renders this approach extremely flexible. In practice, it does not rely upon specific applications to be effective. This solution can be adopted in both pure and hybrid full-duplex scenario, i.e., regardless of how other devices in the network can operate. This implies that this approach is suitable for several possible applications, e.g., smart wireless backhauling solutions, D2D communications, M2M communications and so on.

In FIG. 3, a detail of the embodiment shown in FIG. 2 is shown. Here, the internal workings of the sub-unit 10 of the full duplex radio unit 2, referred to as energy harvesting unit 10, are shown. The sub-unit 10 comprises a signal splitter 31 and a RF-to-DC conversion module 32. The power splitter 31 splits the incoming third signal 22 into the fourth signal 23 and the fifth signal 24. The fifth signal 24 is converted to usable energy by the RF-to-DC conversion module 32. The power splitter 31 is manufactured in an adjustable manner, so that the factor $\sqrt{\rho}$ can be adjusted.

Moreover, the RF-to-DC conversion module 32 can also advantageously be adapted to provide an adaptive output voltage, so as to optimally charge the connected battery, for example by making use of an unregulated buck-boost converter operating in discontinuous conduction mode to achieve a constant input resistance. In general, the efficiency of the overall RF-to-DC conversion can be modeled by a factor η, which is obtained as the ratio of the DC-output power over the RF-input power.

In FIG. 4, an abstract version of the energy harvesting unit 10 is shown. This figure focuses on the input and output signals of the energy harvesting unit 10. The signal to harvest, which corresponds to the fifth signal 24 is a signal whose power is proportional to 1−ρ. The signal is rectified and subsequently handed to the DC-to-DC converter 11, 32. The signal to decode, which corresponds to the fourth signal 23 has a power proportional to ρ. This signal 23 is then handed to the reception unit 4 and is also used for interference cancellation by the interference cancellation unit 9.

Therefore, when the full-duplex radio transmits and receives signals at the same time, and the transmit power is not above the maximum level that guarantees effectiveness of the SI cancellation, the full-duplex system can effectively remove the SI and achieves the expected spectral and energy efficiency. In case though, the transmit power is above the maximum level that guarantees effectiveness of the SI cancellation, the signal coming from the circulator is split into two portions, such that the power of the SI is reduced to meet the condition for the cancellation with state-of-the-art canceller. A signal whose power is proportional to ρ is fed to the decoder. The spectral-efficiency maximizing ρ can be found and adopted. A signal whose power is proportional to 1−ρ is fed to the energy harvester. The resulting energy-saving full-duplex radio unit 2 does not suffer from the same transmit power limitation as the state-of-the-art devices. Both spectral and energy efficiency enhancements are achieved.

The advantages of the proposed energy-saving full duplex radio 2 are as follows:

An energy-saving full-duplex radio is able to cope with any transmit power without incurring into excess of SI during the decoding.

Thanks to the energy harvesting unit 10, some of the wasted energy can be collected and re-used, realizing an energy saving. Remarkably, the extent of the saving increases with the transmit power.

No additional power consumption is needed to operate the energy harvesting unit 10 which can be a passive component.

An adaptive choice of ρ allows to achieve a given target performance in terms of energy/spectral efficiency.

No requirement of a specific scenario to be effective and can be operated in both full-duplex and hybrid half/full-duplex scenarios.

In the context of future networks, e.g., 5G networks, the energy-saving full duplex radio offers an effective solutions to implement full-duplex D2D communications and full-duplex-based in-band wireless backhauling solutions.

Figure 5:
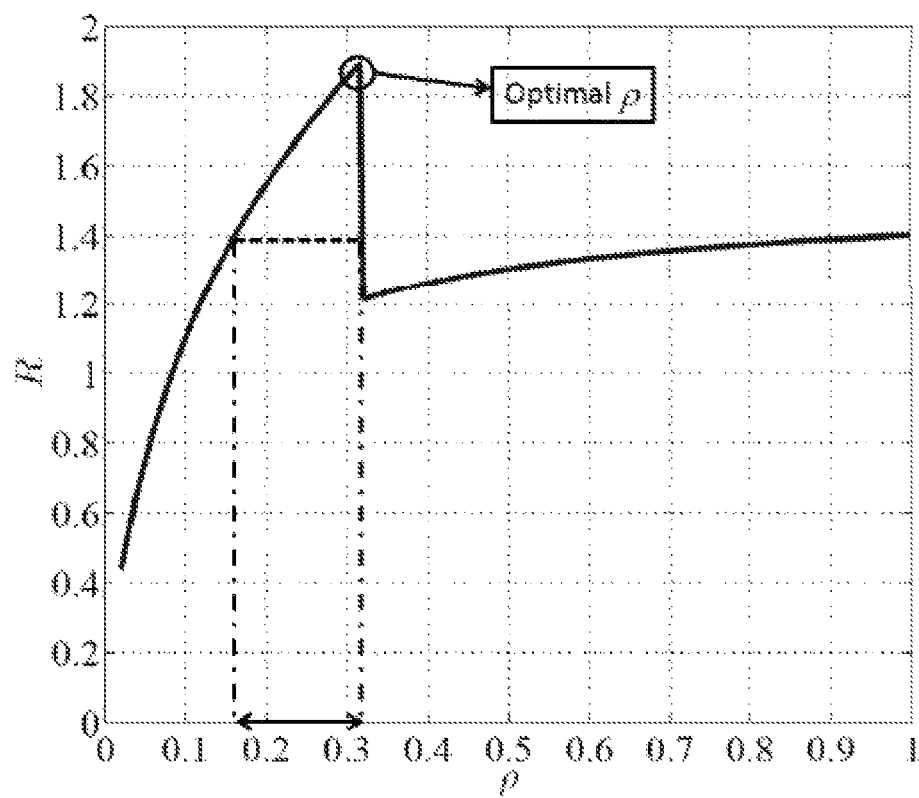
FIG. 5 shows different settings for the factor $\rho$ used in different embodiments of the inventive full duplex radio unit and full duplex radio transmission and reception method.

In FIG. 5, an exemplary performance gain for a specific scenario is shown.

Figure 1:
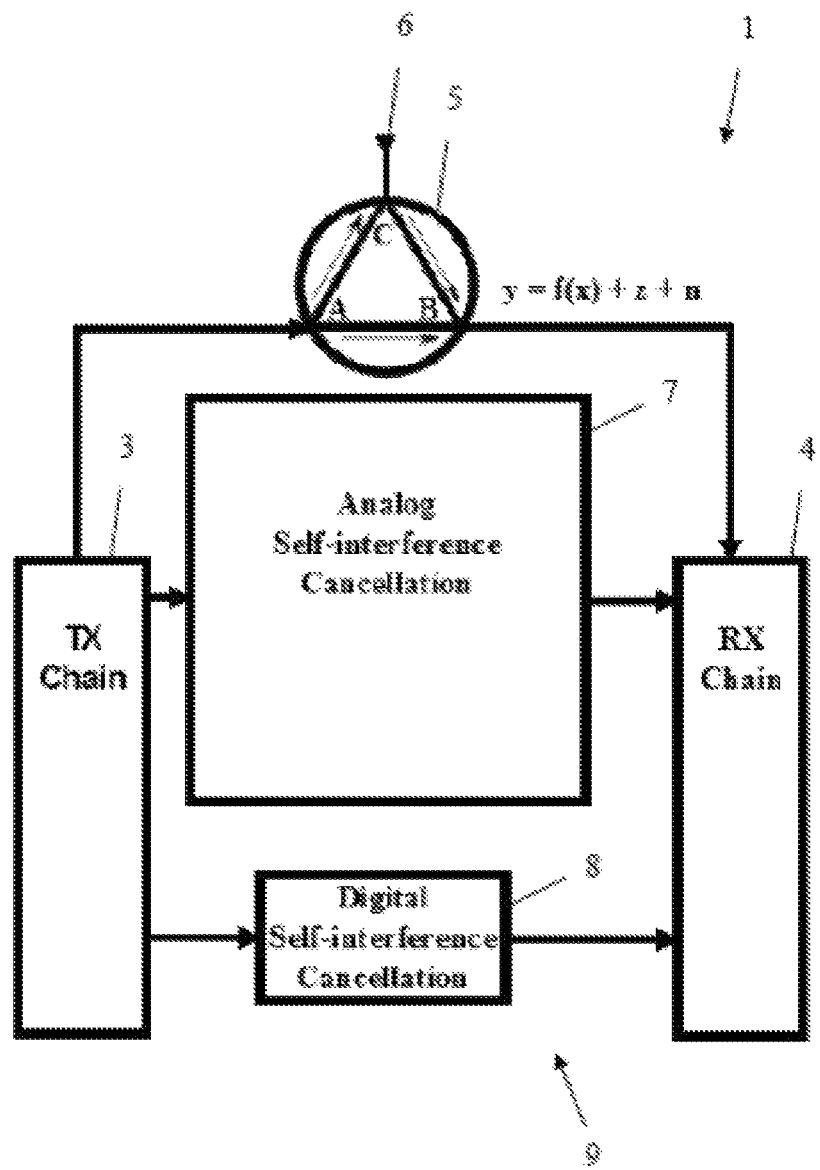
FIG. 1 shows an exemplary full duplex radio unit in a block diagram, in accordance with an embodiment of the invention.

Let the transmit power of the full duplex radio unit 2 be 25 dBm and the noise floor being −90 dBm. An exemplary full duplex radio unit 1 as shown in FIG. 1 cannot provide an effective SI cancellation and some residual SI affects the spectral efficiency of the uplink if unmanaged.

Assume an efficiency of the RF-to-DC conversion equal to η=0.5 .

The resulting spectral efficiency for a legacy full duplex radio without the proposed invention, i.e., of ρ=1 deterministically, is R=1.4 bps/Hz.

The achievable spectral efficiency of the uplink for different values of is depicted in FIG. 5.

It can be clearly seen that:
1. The choice of ρ significantly affects the performance as expected.
2. An optimal value for ρ can be found, to maximize the uplink rate. In particular, if we define $P_{r/h}$ as the maximum amount of power that allows a perfect SI cancellation with respect to the state-of-the-art full duplex implementation, and the overall transmit power of the full duplex radio, then the optimal value of the splitting factor can be found as $$\bar{p} = \frac{P_{th}}{P_{TOT}}.$$

3. The gain with respect to the full duplex radio unit 1 of FIG. 1 can be remarkable, i.e., up to 40% in the considered example.
4. A non-negligible amount of energy, i.e., more than 20% of the received energy in the considered example, can be processed for harvesting, realizing the energy saving.

Figure 6:
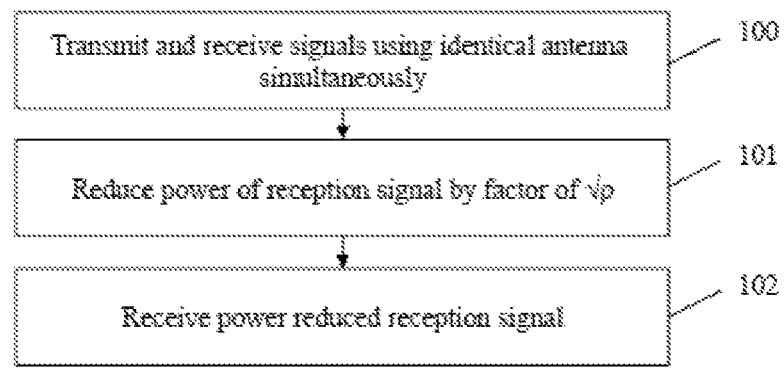
FIG. 6 shows a first embodiment of the inventive full duplex radio transmission and reception method, in a flow diagram.

In FIG. 6 a first embodiment of the inventive method is shown. In a first step 100, a first signal is transmitted, while a second signal is received. In a second step 101, the power of a third signal, which comprises the second signal and interference from the first signal is reduced by multiplying it with a factor of √ρ. Thereby a fourth signal is generated. In a third step 102, the power reduced fourth signal is received.

Figure 7:
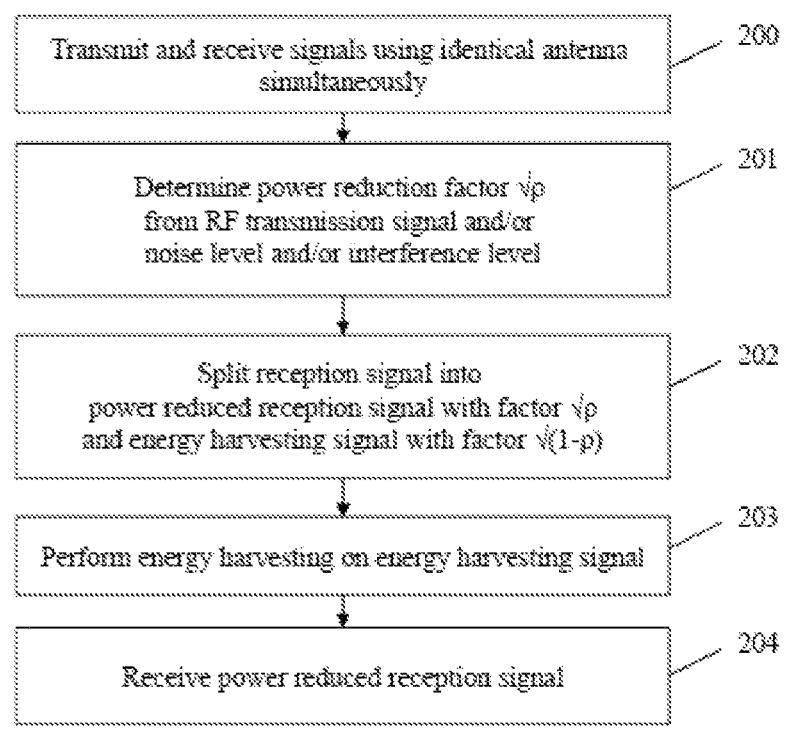
FIG. 7 shows a second embodiment of the full duplex radio transmission and reception method in a flow diagram.

FIG. 7 shows a second embodiment of the inventive method. In a first step 200, a first signal is transmitted, while a second signal is received. At the same time, a third signal is generated from the received second signal and interference. In a second step 201, a power reduction factor √ρ is determined based upon an RF transmission signal and/or a noise level and/or a interference level of the third signal. In a third step 202, the third signal is split into a fourth signal by multiplying it with √ρ and into a fifth signal by multiplying it with √(1−ρ). In a fourth step 203, an energy harvesting is performed on the fifth signal. In a fifth step 204, the power reduced fourth signal is received.

Regarding the implementation details of the method it is also referred to the earlier elaborations regarding the device.

The invention is not limited to the examples. The characteristics of the exemplary embodiments can be used in any combination.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

What is claimed is:

1. A full duplex radio, comprising a transmitter, an antenna, a receiver, a circulator, and a power reducer,
   wherein the transmitter is adapted to generate a first signal,
   wherein the circulator is adapted to provide the first signal from the transmitter to the antenna,
   wherein the antenna is adapted to transmit the first signal and simultaneously receive a second signal using an identical frequency or frequency band,
   wherein the circulator is adapted to provide a third signal to the power reducer, wherein the third signal comprises the second signal and interference generated from the first signal by the antenna and the circulator,
   wherein the power reducer is adapted to reduce the power of the third signal by multiplying the third signal with a factor of √ρ, wherein ρ is between 0 and 1, thereby generating a fourth signal, and
   wherein the receiver is adapted to receive the fourth signal.

2. The full duplex radio according to claim 1,
   wherein the full duplex radio further comprises an interference cancellation unit adapted to generate at least one interference cancellation signal and to provide the at least one interference cancellation signal to the receiver, and
   wherein the receiver is adapted to cancel at least part of the interference by adding the interference cancellation signal to the fourth signal or an intermediate signal derived from the fourth signal by the receiver.

3. The full duplex radio according to claim 1,
   wherein the power reducer is adapted to determine and set the factor √ρ depending upon the transmission power of the first signal.

4. The full duplex radio according to claim 2,
   wherein the power reducer is adapted to determine and set the factor √ρ depending upon one or more of a transmission power of the first signal, a noise level, and an interference level within the third signal, so that a pre-set target signal-to-interference-plus-noise-ratio SINR of the fourth signal is reached.

5. The full duplex radio according to claim 2, wherein the power reducer is adapted to determine and set the factor $\sqrt{\rho}$ such that a signal-to-interference-plus-noise-ratio SINR of the fourth signal is higher than a signal-to-interference-plus-noise-ratio SINR of the third signal.

6. The full duplex radio according to claim 1, wherein the power reducer comprises a signal splitter adapted to split the third signal into the fourth signal and a fifth signal, wherein the signal splitter is adapted to split the third signal so that the fourth signal is the third signal multiplied by $\sqrt{\rho}$ and the fifth signal is the third signal multiplied by $\sqrt{(1-\rho)}$.

7. The full duplex radio according to claim 6, wherein the power reducer comprises an energy harvesting unit adapted to harvest at least part of the energy of the fifth signal.

8. The full duplex according to claim 7, wherein the energy harvesting unit is adapted to at least partially power the full duplex radio using the harvested energy of the fifth signal.

9. The full duplex radio according to claim 7, wherein the full duplex ratio further comprises a battery, wherein the energy harvesting unit is adapted to charge the battery using the harvested energy of the fifth signal.

10. A full duplex radio transmission and reception method, comprising:
generating a first signal by a transmitter,
providing the first signal to an antenna by a circulator,
transmitting the first signal by the antenna,
simultaneously receiving a second signal using an identical frequency or frequency band as the first signal by the antenna,
providing a third signal by the circulator, wherein the third signal comprises the second signal and interference generated from the first signal by the antenna and the circulator,
reducing the power of the third signal by multiplying the third signal with a factor of $\sqrt{\rho}$, wherein $\rho$ is between 0 and 1, by a power reducer, thereby generating a fourth signal, and
receiving the fourth signal by a receiver.

11. The full duplex radio transmission and reception method according to claim 10,
further comprising:
generating at least one interference cancellation signal, and
cancelling at least part of the interference by adding the interference cancellation signal to the fourth signal or an intermediate signal derived from the fourth signal.

12. The full duplex radio transmission and reception method according to claim 10,
wherein $\rho$ is determined and set depending upon a transmission power of the first signal.

13. The full duplex radio transmission and reception method according to claim 11,
wherein the factor $\sqrt{\rho}$ is determined and set depending upon the transmission power of the first signal and/or a noise level and/or an interference level within the third signal, so that a pre-set target signal-to-noise-and-interference-ratio of the fourth signal is reached.

14. The full duplex radio transmission and reception method according to claim 10,
wherein the third signal is split into the fourth signal and a fifth signal, wherein the third signal is split so that the fourth signal is the third signal multiplied by $\sqrt{\rho}$ and the fifth signal is the third signal multiplied by $\sqrt{(1-\rho)}$.

15. The full duplex radio transmission and reception method according to claim 14,
wherein at least part of the energy of the fifth signal is harvested.

* * * * *